June 11, 1968 — B. G. WINN — 3,387,777

TRUE PRICE INDICATOR

Filed April 21, 1967

INVENTOR.
BURDETTE G. WINN
BY
William G. Babcock
ATTORNEY

United States Patent Office 3,387,777
Patented June 11, 1968

3,387,777
TRUE PRICE INDICATOR
Burdette G. Winn, Los Angeles, Calif. (Box 362, 3270 Firestone Blvd., South Gate, Calif. 90280)
Filed Apr. 21, 1967, Ser. No. 632,683
6 Claims. (Cl. 235—70)

ABSTRACT OF THE DISCLOSURE

A portable device that may be easily used by a shopper or other interested person, to compute the price per pound of merchandise when the merchandise is offered for sale in single or multiple units of known weight, and also used by a retailer to determine the shelf price of units to yield a predetermined price per pound when sold.

BACKGROUND OF THE INVENTION

(1) Field of the invention

A portable device that may be manually manipulated by the user to indicate the price per pound when the shelf price is known together with the weight of the unit or units being offered for sale at that particular price.

(2) Description of the prior art

In shopping in grocery stores and supermarkets, it is common to find a number of containers of merchandise each of a known weight, offered for sale in groups at a particular price. Likewise, comparable merchandise, but of a different brand or trademark may be available for purchase at a specific price per can. There is little or no uniformity as to the weight of the container at a particular price, and the problem arises as to whether a group of containers of known weight or a competitive product is the most economical purchase ona price per pound basis.

Prior to the present invention, there has been no compact, lightweight, portable, easily manipulated computer that permits a shopper to readily determine the cost per pound of merchandise offered at a particular price in multiple containers, relative to the price per pound of merchandise in a single container. The computer of the present invention permits a shopper, when the weight of a container or a group thereof and the shelf price thereof is known, to easily compute the price per pound of various brands of the same merchandise, whereby it is possible to select the most economical purchase on a price per pound basis.

SUMMARY OF THE INVENTION

The invention comprises a compact, lightweight, portable computer of a size as to be adapted for carrying in a woman's handbag, or suspended by a cord from about the neck for convenient use in quickly and easily determining the most economical purchase available when the shelf prices of various brands of the same merchandise are known, as well as the weight of the merchandise in each container. Use of the computer permits such determination to be made without extensive figuring and time-consuming computation, which a housewife is not normally inclined to perform.

A major object of the invention is to provide a computing device particularly adapted for the purpose described, which is of simple mechanical structure, can be fabricated from standard, commercially available materials, requires no maintenance attention, will remain operative even when subjected to relatively hard usage, and can be retailed at a sufficiently low price as to encourage the widespread use thereof.

Another object of the invention is to supply a computing device which may be used by a retailer in reversing the above described computation, and quickly price units of merchandise for sale at a specific price per pound.

DESCRIPTION OF THE PREFERRED EMBODIMENT

Figure 3:
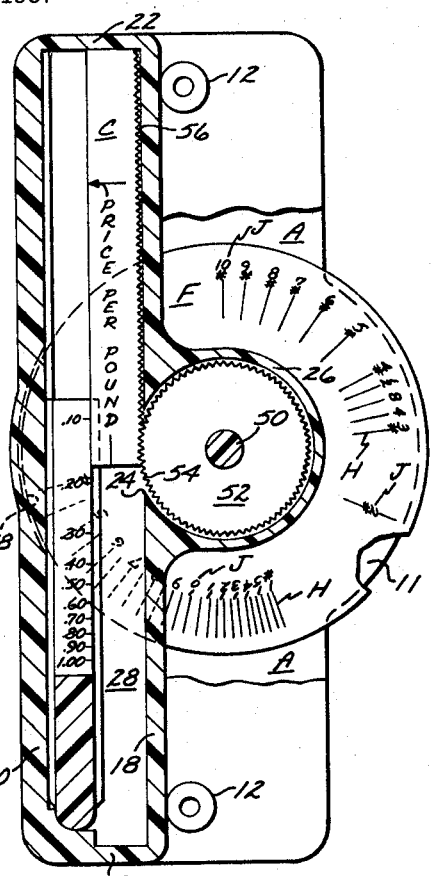
FIGURE 3 is a longitudinal cross-sectional view of the device, taken on the line 3—3 of FIGURE 2.

With continued reference to the drawing for the general arrangement of the invention, it will be seen in FIGURE 3 to include a rectangular base plate A from the right-hand side of which an arcuate segment 11 projects. A housing B overlies plate A and is preferably removably secured thereto by hollow rivets 12 (FIGURE 1) or other conventional fastening means. An endless cord 12' may be extended through rivet 12 to support the indicator from the neck of a user.

Figure 1:
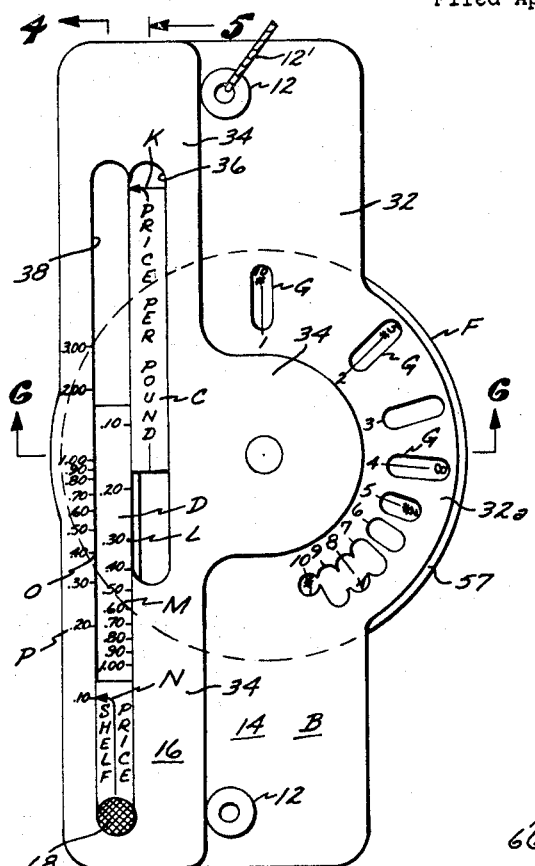
FIGURE 1 is a top plan view of the computing device.

Housing B includes a longitudinally extending first portion 14, and a second longitudinally extending portion 16 of greater height than the first portion, also shown in FIGURE 1. Incorporated in the second portion 16 are two laterally spaced, parallel, longitudinally extending ribs 18 and 20 (FIGURE 3) that are joined on their ends by second ribs 22. At substantially the midpoint of rib 18 an opening 24 is formed therein. The ends of the rib 18 adjacent opening 24 develop into a circular rib 26.

Figure 4:
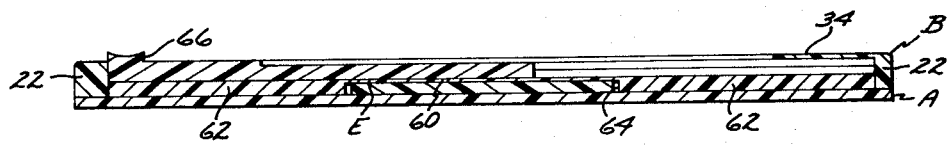
FIGURE 4 is a second longitudinal cross-sectional view of the computer, taken on the line 4—4 of FIGURE 1.

Ribs 18, 20 and 22 cooperatively define an elongate confined space 28 in which first and second slides C and D, best seen in FIGURE 3, are disposed for longitudinal movement. Slides C and D are movably supported on an elongate slide support E, illustrated in FIGURE 4, and situated in confined space 28.

Figure 6:
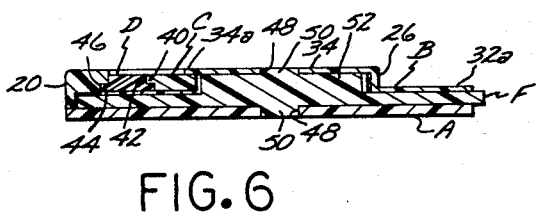
FIGURE 6 is a transverse cross-sectional view of the computer, taken on the line 6—6 of FIGURE 1.

The lower edges of ribs 18 and 26 merge into a first web 32 that has an arcuate mid-portion 32a projecting therefrom which is of the same size and shape as the section 11. The upper edges of ribs 18, 20 and 22 merge into a second flat web 34, as shown in FIGURES 1 and 6. First and second elongate, longitudinally disposed openings 36 and 38, respectively, are formed in the left-hand portion of second web 34 (FIGURE 1) that are in communication with one another. First opening 36 is in vertical alignment with first slide C, and second opening 38 in alignment with second slide D.

The slides C and D are of such length as to at all times be in slidable contact. Slide C includes a longitudinally extending tongue 40 (FIGURE 6) that movably engages a longitudinal groove 42 formed on slide D. Slide D is provided with a longitudinally extending tongue 44 that movably engages a groove 46 formed on the inner face of rib 20, as shown in FIGURE 6. A longitudinally extending segment 34a of second web 34 projects to the left over first slide C, as illustrated in FIGURE 6. Due to this structure, the slides C and D are removably locked within confined space 28.

Aligned bores 48 are formed in base plate A and housing B, as best seen in FIGURE 6, that are rotatably engaged by stub shafts 50. Shafts 50 project outwardly in opposite directions from a disc F provided with a pinion 52 formed as a part thereof. The disc F and pinion 52 are disposed within a confined space defined between the base plate A and housing B, as may be seen in FIGURES 2, 3 and 6. Teeth 54 are formed on the peripheral edge of pinion 52, and engage a toothed rack 56 defined on the right-hand side of the first slide C, as shown in FIGURE 3.

The disc F, as may be seen in FIGURE 3, is of such diameter as to project outwardly to the right a slight distance from the peripheral edge of the segment 11, as well as the outer edge of the web portion 32a, and this outwardly projecting portion 57 of the disc is easily engaged by the thumb to rotate the disc for reasons to be described later.

Figure 5:
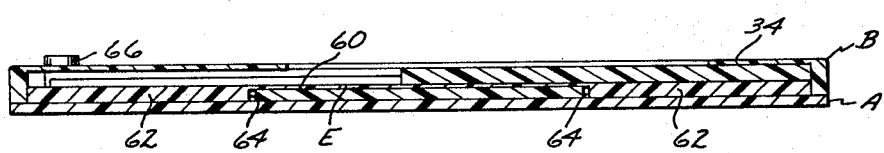
FIGURE 5 is a third longitudinal cross-sectional view of the device, taken on the line 5—5 of FIGURE 1.

The disc F extends transversely across the base plate A and housing B, with a segment of the disc on the left-hand side thereof being rotatably movable in an arcuate recess 58 formed in the interior under portion of the rib 20. Disc F extends under the central portion of the slide support E, as can best be seen in FIGURES 4 and 5. Support E includes an elongate rectangular web 60 from opposite ends of which blocks 62 project downwardly, with these blocks defining a space 64 therebetween in which a portion of the disc F is disposed.

The slide support E prevents the first and second slides C and D that are movably mounted thereon from coming into contact with the upper surface of this disc as it is rotated. The web 32 (FIGURE 1) has a number of circumferentially spaced, radially extending elongate windows G formed therein. The numerals 1 to 10 inclusive are imprinted on web 32 adjacent to the windows G, the purpose of which numerals will be explained hereinafter.

A number of circumferentially spaced, radially extending graduations H are marked on disc F and each graduation is identified by a particular numeral, generally identified by the letter J, that indicates a particular weight, either in pounds, ounces, or other measure by weight, or combinations thereof, as illustrated in FIGURE 3. The disc F may be manually rotated by contacting the portion 57 thereof to place a desired one of the numerals J under a particular one of the windows G to aid in the computation of the price per pound of merchandise.

Transverse arrows K are imprinted on the first slide C, as well as the notation "Price Per Pound." A number of longitudinally spaced graduations L are also marked on the second slide D, and these latter graduations have imprinted numerals M associated therewith that indicate a particular price within a range of from 10¢ to $1.00.

Figure 2:
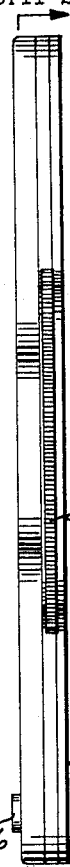
FIGURE 2 is a side elevational view of the computer.

On the lower portion of the second slide D (FIGURE 1) a transverse arrow N is imprinted and located adjacent thereto, the notation "Shelf Price." On the left-hand side of the web 32 a number of longitudinally spaced graduations O are marked, together with adjacently positioned numerals, generally identified by the letter P. These latter markings indicate an increase in magnitude from the bottom towards the top of the web, as shown. These numerals P will normally range from 10¢ to $3.00. To permit easy movement of slide D relative to the housing B, slide D is provided with a raised end portion 66 that may be engaged by a thumb or finger (not shown). Portion 66 preferably has a knurled upper surface 68. Surface 68 is disposed a substantial distance above the second web 34, as shown in FIGURE 2.

The use of the device is best explained by resorting to a simple example. A shopper finds that five 2-lb. containers of merchandise are offered for a shelf price of $1.00, and desires to know the price per pound thereof. The shopper rotates disc F to position one of the graduations H and associated numeral J which indicates "two lbs.," and is in alignment with the window G with which the numeral "5" is associated. As this rotation of the disc takes place, the teeth 54 of the pinion 52 engage the rack 56 to move the first slide C longitudinally relative to the housing B. The second slide D is then moved to place the arrow N in transverse alignment with the numeral P indicating "1.00." The numbered graduations on disc F and the numbered graduations L and O are so related that when the arrow N is disposed in the manner described, the arrow K is brought into transverse alignment with the numeral M indicating ".10." Accordingly, the price per pound of the merchandice is 10¢.

The above example is merely for the purpose of illustration, for it is so simple that it could be solved mentally without difficulty. A normal problem involved in shopping is one involving three 1-lb., 2 ounce containers priced at one dollar, and deciding if this is a more economical purchase than a single 3-lb., 8 ounce container of a competitive product offered at 90¢.

The computing device described herein is used to determine the price per pound of each product, with the product having the lowest price per pound of course being the most economical buy.

I claim:

1. A portable computer for determining the price per pound of merchandise when the shelf price of said merchandise, the number of said units offered at said shelf price, and the weight of each of said units is known, including:
   (a) a plate;
   (b) a housing in which first and second parallel openings are formed that is mounted on said plate;
   (c) rib means on said housing, which means together with said plate, cooperatively define an elongate confined space that is in communication with said openings;
   (d) a disc rotatably supported in said housing, which disc is of such size as to partially project through an opening in one side of said housing;
   (e) a pinion rigidly secured to said disc;
   (f) a first elongate slide including a toothed rack on one side thereof, with said slide being longitudinally movable in said confined space and in longitudinal alignment with said first opening;
   (g) a second elongate slide longitudinally movable in said confined space and in longitudinal alignment with said second opening;
   (h) first circumferentially spaced weight indicating means on said disc, which may by manual rotation of said disc, be selectively positioned under any one of a plurality of windows formed in said housing;
   (i) visual means on said housing identifying each of said windows with a particular number of said units;
   (j) means indicating price per pound on said first slide;
   (k) means indicating shelf price per pound on said second slide;
   (l) a first graduated scale of shelf prices provided on said housing adjacent said second opening; and
   (m) a second graduated scale provided on said second slide, with said first slide being longitudinally moved in said housing due to rotation of said pinion relative to said rack as said disc is rotated to place an appropriate one of said weight indicating means in alignment with an appropriate one of said windows, with said price per pound indicating means being transversely aligned with a specific graduation on said second scale that indicates said price per pound after said second slide has been moved in said confined space to position said shelf price per pound indicating means in transverse alignment with an appropriate graduation on said first graduated scale.

2. A computer as defined in claim 1, wherein said first and second slides are disposed in side-by-side relationship and are of such configuration as to movably interlock with one another and said housing.

3. A computer as defined in claim 1, which further includes:
   (n) an elongate slide support disposed in said confined space and at least partially overlying said disc, which support has said first and second slides resting thereof, with said support preventing inadvertent movement of said second slide when said disc is rotated.

4. A computer as defined in claim 1 wherein said plate and housing are generally rectangular, which housing is defined by first and second longitudinally extending portions, with said first portion being at a lower elevation than that of said second portion, and said first portion having said windows formed therein, which second portion has said first and second openings formed therein, said computer further including:

(n) a raised end portion on said second slide that permits the easy and convenient manipulation of said second slide by thumb or finger.

5. A computer as defined in claim 4, which further includes:

(o) a semi-circular segment on said plate that extends outwardly therefrom and is located under said disc, with said segment having a lesser radius than that of said disc; and (p) an arcuate segment of said first portion of said housing that extends outwardly therefrom over said disc, with at least a portion of said arcuate portion having said windows formed therein and with said arcuate portion having a radius less than that of said disc, which arcuate segment and arcuate portion protect said disc, and cooperatively provide a narrow projecting portion of said disc that may be easily manipulated by the user of said computer.

6. A computer as defined in claim 1, which further includes:

(n) a plurality of hollow fastening means that removably secure said housing to said plate;

(o) an endless cord that extends through one of said hollow fastening means and permits said computer to be suspended from the neck of a user.

References Cited

UNITED STATES PATENTS

| | | | |
|---|---|---|---|
| 479,531 | 7/1892 | Robertson | 235—76 |
| 2,506,176 | 5/1950 | Sbernadori | 235—70 |

STEPHEN J. TOMSKY, *Primary Examiner.*